(12) United States Patent
Xu

(10) Patent No.: US 8,973,455 B2
(45) Date of Patent: Mar. 10, 2015

(54) ELECTRIC DRILL FORWARD AND REVERSE ROTATION AUTOMATIC SWITCHING APPARATUS

(75) Inventor: Feihao Xu, Yongkang (CN)

(73) Assignee: Zhejiang University, Hangzhou, Zhejiang Province (CN)

( * ) Notice: Subject to any disclaimer, the term of this patent is extended or adjusted under 35 U.S.C. 154(b) by 0 days.

(21) Appl. No.: 13/983,057

(22) PCT Filed: Sep. 6, 2011

(86) PCT No.: PCT/CN2011/079377
§ 371 (c)(1),
(2), (4) Date: Aug. 1, 2013

(87) PCT Pub. No.: WO2012/151816
PCT Pub. Date: Nov. 15, 2012

(65) Prior Publication Data
US 2013/0305860 A1    Nov. 21, 2013

(30) Foreign Application Priority Data

May 9, 2011    (CN) ............................ 2011 1 0120888
May 9, 2011    (CN) ....................... 2011 2 0148034 U

(51) Int. Cl.
*F16H 3/14*    (2006.01)
*B23B 45/00*    (2006.01)

(52) U.S. Cl.
CPC ................ *F16H 3/14* (2013.01); *B23B 45/008* (2013.01)
USPC ............................................ 74/377; 173/216

(58) Field of Classification Search
CPC ....... B25F 5/001; B25F 5/003; B23B 45/001; B23B 45/02
USPC .............. 74/377; 173/48, 109, 178, 216, 217, 173/124
See application file for complete search history.

(56) References Cited

U.S. PATENT DOCUMENTS

| | | | | |
|---|---|---|---|---|
| 2,370,885 A | * | 3/1945 | Sohm | 74/329 |
| 2,942,499 A | * | 6/1960 | Macy | 408/124 |
| 4,098,351 A | * | 7/1978 | Alessio | 173/13 |
| 4,971,156 A | * | 11/1990 | Wong | 173/178 |
| 5,020,606 A | * | 6/1991 | Odor et al. | 173/216 |
| 7,290,964 B2 | * | 11/2007 | Hsieh | 408/133 |
| 7,494,437 B2 | * | 2/2009 | Chen | 475/149 |
| 7,900,715 B2 | * | 3/2011 | Chen | 173/183 |
| 7,987,922 B2 | * | 8/2011 | Tokunaga | 173/178 |
| 8,075,229 B2 | * | 12/2011 | Mok et al. | 408/124 |
| 8,336,641 B2 | * | 12/2012 | Zhang et al. | 173/216 |

(Continued)

*Primary Examiner* — William Kelleher
*Assistant Examiner* — Zakaria Elahmadi
(74) *Attorney, Agent, or Firm* — Han IP Corporation

(57) ABSTRACT

An electric drill forward and reverse rotation automatic switching apparatus includes: a gearbox, a first-stage gear, a first-stage gear shaft, a second-stage gear, a second-stage gear shaft, a transition gear, a transition shaft, a third-stage gear, and an output shaft. The first-stage gear is fixed on the first-stage gear shaft. The second-stage gear is fixed on the second-stage gear shaft. The first-stage and second-stage gear shafts are disposed on the gearbox housing. The transition gear is disposed on the transition shaft which is fixed on the gearbox housing. The output shaft is disposed on the gearbox housing. The third-stage gear is sleeved on the output shaft and disposed on the gearbox housing. The first-stage gear shaft engages with the second-stage gear and the transition gear simultaneously. The transition gear engages with the third-stage gear. The second-stage gear shaft and the output shaft are on the same axis.

2 Claims, 2 Drawing Sheets

(56) References Cited

U.S. PATENT DOCUMENTS

| | | | |
|---|---|---|---|
| 8,387,719 B2* | 3/2013 | Scrimshaw et al. | 173/47 |
| 8,651,199 B2* | 2/2014 | Ho | 173/176 |
| 8,727,941 B2* | 5/2014 | Aoki | 477/13 |
| 2008/0173459 A1* | 7/2008 | Kuroyanagi et al. | 173/216 |
| 2009/0260466 A1* | 10/2009 | Nakamura | 74/332 |
| 2009/0277658 A1* | 11/2009 | Chen | 173/183 |
| 2010/0319947 A1* | 12/2010 | Zhang et al. | 173/216 |
| 2012/0040793 A1* | 2/2012 | Hashimoto | 475/149 |
| 2012/0142484 A1* | 6/2012 | Chen et al. | 475/254 |
| 2012/0318548 A1* | 12/2012 | Hirabayashi et al. | 173/93.6 |

* cited by examiner

ELECTRIC DRILL FORWARD AND REVERSE ROTATION AUTOMATIC SWITCHING APPARATUS

CROSS REFERENCE TO RELATED APPLICATIONS

This application is the U.S. national phase application of International application number PCT/CN2011/079377, filed on 6 Sep. 2011, which claims the priority benefit of China Patent Applications No. 201120148034.7 and No. 201110120888.9, both filed on 9 May 2011. The above-identified applications are hereby incorporated by reference in their entirety.

TECHNICAL FIELD

The present disclosure relates to an electric drill and, more particularly, to an automatically switching apparatus which automatically controls a drill head that can be selectively forwardly or reversely rotated during drilling or tapping.

BACKGROUND

Currently, as to electric tools at home and abroad, in order to change the rotation direction of a drill head of an electric drill, the electric drill in the prior art generally changes the direction of the electric current through a switch to reverse the rotational direction of a motor. This mode of operation has a number of problems.

Firstly, the motor and the switch tend to be relatively greatly damaged because they have to bear huge amount of reverse current, resulting in shortened service life.

Secondly, the manufacturing process of a forward and reverse motor is very complicated, and its electromagnetic interference is also great.

Thirdly, when the electric drill is changed from forward rotation to reverse rotation, it needs to be slowed down, stopped and reaccelerated. This tends to take relatively long time, resulting in low working efficiency.

Fourthly, the electric drill consumes a large amount of energy when it changes rotation direction, particularly when it is used to tap. The electric drill is frequently operated and thus may overheat and become damaged.

Regarding the problem of the electric drill due to changing its rotation direction, a novel electric drill needs to be a safe, environmentally-protecting and energy-saving product with time-saving and labor-saving advantages when its rotational direction is changed.

SUMMARY

In order to overcome the above problems associated with prior art electric drill, an objective of the present disclosure is to provide an electric drill forward and reverse rotation automatic switching apparatus which is capable of automatically forwardly and reversely rotating the electric drill. The apparatus has a simple and reasonable structure, simple-to-use operation, high production efficiency, and does not require stopping to change the rotational direction.

An apparatus according to the present disclosure has the following technical features to solve aforementioned problems: the apparatus comprises a gearbox, a first-stage gear 7, a first-stage gear shaft, a second-stage gear, a second-stage gear shaft, a transition gear, a transition shaft, a third-stage gear and an output shaft. The first-stage gear is fixed on the first-stage gear shaft; the first-stage gear is rotatably disposed on the gear box. The second gear is fixed on the second-stage gear shaft. The first-stage gear is rotatably disposed on the gear box. The transition gear is rotatably disposed on the transition shaft; the transition shaft is fixed on the gearbox. The output shaft is disposed on the gearbox. The third-stage gear is sleeved on the output shaft and rotatably disposed on the gearbox. The output shaft may be axially moved with respect to the third gear and the gearbox. The first-stage gear engages with a gear shaft of a rotor of a motor. The first-stage gear shaft engages with the second-stage gear shaft and the transition gear simultaneously. The transition gear engages with the third-stage gear. The second-stage gear shaft and the output shaft are on the same axis. An automatic clutch mechanism is provided between the second-stage gear and the third-stage gear.

In one embodiment, the automatic clutch mechanism comprises a clutch convex platform disposed on the second-stage gear and the third-gear respectively, a clutch block disposed on the output shaft, a spring and a ball, wherein the end part of the output shaft is provided with a center hole. The spring and the ball are mounted in the center hole in turn. The head part of the second-stage gear shaft contacts with the ball and extends into the center hole. The clutch block of the output shaft engages with the clutch convex platform of the second-stage gear when being contracted. The clutch block of the output shaft engages with the clutch convex platform of the third-stage gear when being in a free state.

In one embodiment, a back plate is provided between the second-stage gear and the third-stage gear. The back plate is fixed on the gearbox.

In view of the prior art, the apparatus of the present disclosure has a number of advantages and effects. Firstly, an electric drill may automatically switch between forward and reverse rotations through a mechanical transmission method in the case of no stop and forded change in rotational direction, thus having simple, practical and convenient operation. Secondly, as the forward and reverse rotations may be achieved at the moment the motor halts, the apparatus of the present disclosure can achieve fast switching speed, steady work, time and labor saving and high production efficiency. Thirdly, during the process of forward and reversible rotations of the motor, as the motor does not need to be slowed down, stopped and then started up again, the motor and the switch bear smaller shock and have longer service life compared to that of the prior art, especially during tapping operation, as the motor is not overheated and damaged.

Motor Rotor Gear Shaft; 2: Supporting Bearing of Rotor; 3: First-Stage Gear Shaft Bearing; 4: Snap Spring; 5: Woodruff Key; 6: First-Stage Gear Shaft; 7: First-Stage Gear; 8: Snap Spring; 9: Transition Gear; 10: Transition Shaft; 11: First-Stage Gear Shaft Bearing; 12: Output Shaft; 13: Shaft Sleeve; 14: Spring; 15: Third-Stage Gear Bearing; 16: Ball; 17: Third-Stage Gear; 18: Middle Bearing; 19: Back Plate; 20: Second-Stage Gear; 21: Woodruff Key; 22: Snap Spring; 23: Second-Stage Gear Shaft; 24: Second-Stage Gear Shaft Bearing; 25: Clutch Convex Platform; 26: Clutch Block.

DETAILED DESCRIPTION OF THE PREFERRED EMBODIMENTS

Figure 1:
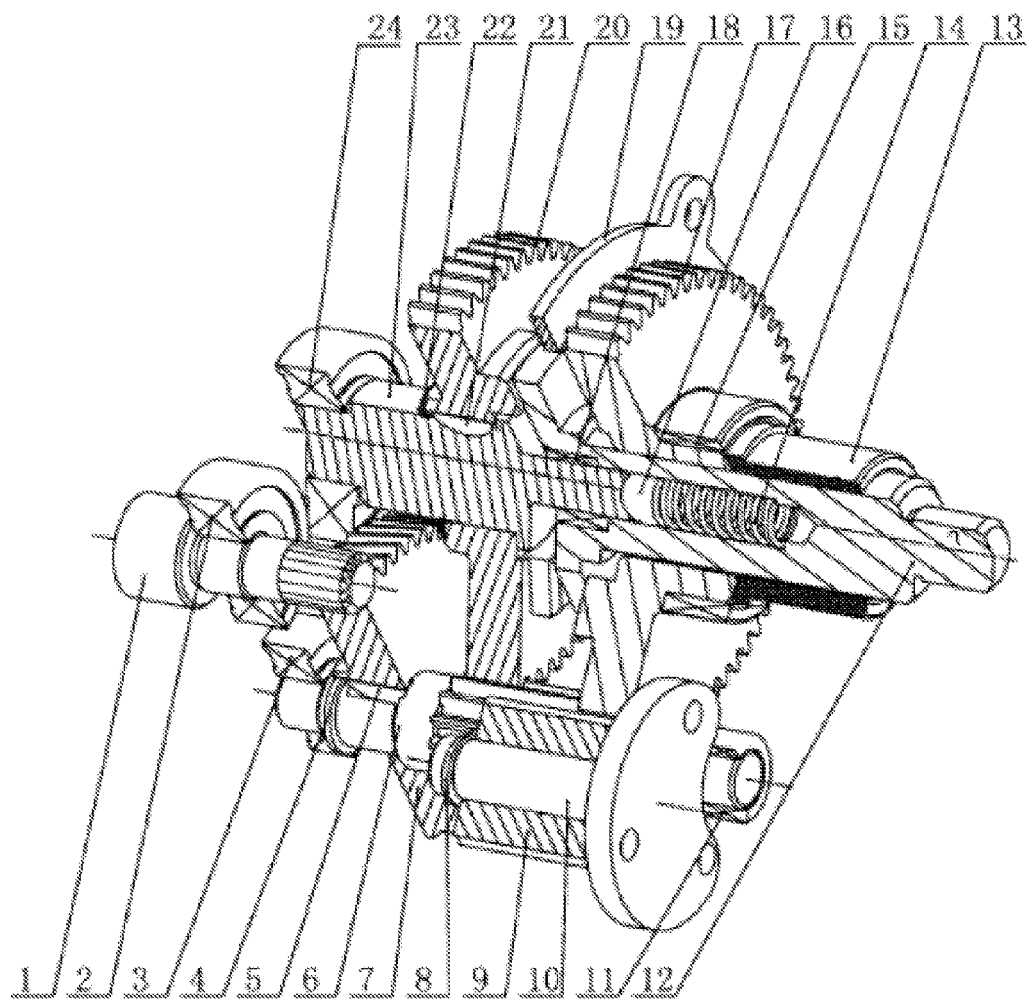
FIG. 1 is a diagram of an apparatus in accordance with the present disclosure.
Figure 2:
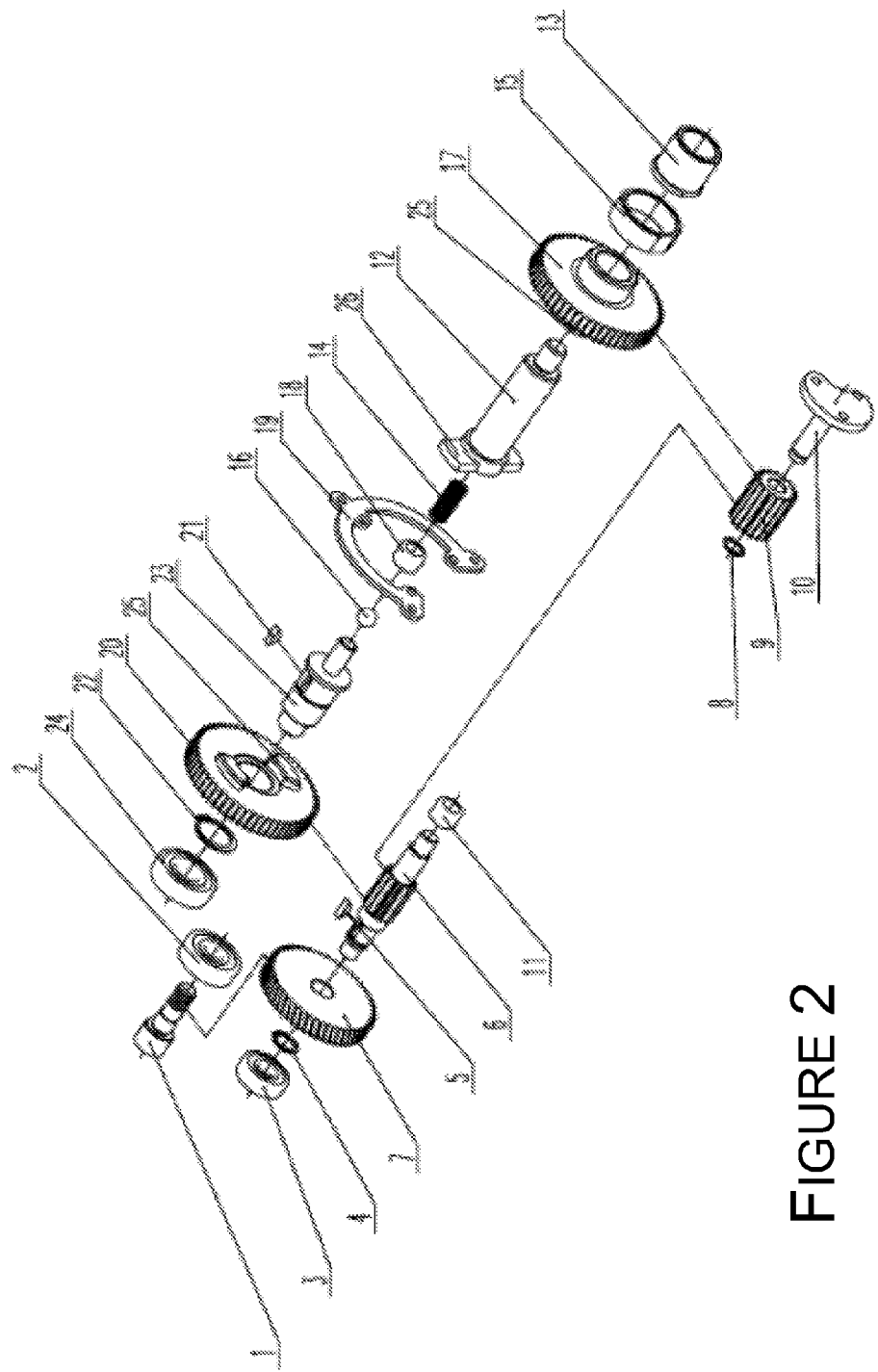
FIG. 2 is an exploded view of the apparatus in accordance with the present disclosure.

As shown in FIGS. 1 and 2, the apparatus of the present disclosure is an electric drill forward and reverse rotation automatic switching apparatus. The apparatus comprises a gearbox, a first-stage gear 7, a first-stage gear shaft 6, a second-stage gear 20, a second-stage gear shaft 23, a transition gear 9, transition shaft 10, a third-stage gear 17 and an output shaft 12. The drill head is fixed on the output shaft 12 through a drill chuck. The first-stage gear 7 is fixed on the first-stage gear shaft 6 through a woodruff key 5 and limited by a snap spring 4. The two ends of the first-stage gear shaft 6 are rotatably disposed on the gearbox through the first-stage gear shaft bearings 3 and 11. The second-stage gear 20 is fixed on the second-stage gear shaft 23 through the woodruff key 21 and limited by the snap spring 22. One end of the second-stage gear shaft 23 is rotatably disposed on the gearbox through the second-stage gear shaft bearing 24. The transition gear 9 is rotatably disposed on the transition shaft 10 and limited by the snap spring 8. The transition shaft 10 is fixed on the gearbox; the output shaft 12 is disposed on the gearbox through a shaft sleeve 13. The third-stage gear 17 is sleeved on the output shaft 12 and rotatably disposed on the gearbox through the third-stage gear bearing 15. The output shaft 12 may be axially moved with respect to the third gear 17 and the gearbox. The first-stage gear 7 engages with a gear shaft 1 of a rotor of a motor. The gear shaft 1 of the rotor of the motor is disposed on the motor through the supporting bearing 12 of the rotor; the first-stage gear shaft 6 engages with the second-stage gear 20 and the transition gear 9 simultaneously. The transition gear 9 engages with the third-stage gear 17. The second-stage gear shaft 23 and the output shaft 12 are on the same axis. An automatic clutch mechanism is provided between the second-stage gear 20 and the third-stage gear 17.

The automatic clutch mechanism comprises a clutch convex platform 25 fixedly disposed on the second-stage gear 20 and the third-gear 17 respectively, a clutch block 26 fixedly disposed on the output shaft 12, a spring 14 and a ball 16. The end part of the output shaft 12 is provided with a center hole. The spring 14 and the ball 16 are mounted in the center hole in turn. The head part of the second-stage gear shaft 23 contacts with the ball 16 and extends into the center hole. A middle bearing 18 is provided between the second-stage gear shaft 23 and the center hole of the output shaft 12. The middle bearing 18 is fixed on the end surface of the center hole of the output shaft 12, so that the output shaft 12 may not only be rotated but also be axially moved the with respect to the second-stage gear shaft 23. The clutch block 26 of the output shaft 12 engages with the clutch convex platform 25 of the second-stage gear 20 when being contracted; and the clutch block 26 of the output shaft 12 engages with the clutch convex platform 25 of the third-stage gear 17 when being in free state; a back plate 19 is provided between the second-stage gear 20 and the third-stage gear 17. The back plate 19 is fixed on the gearbox; and the main role of the back plate 9 is to prevent the third-stage gear 17 from being axially deviated, so that the second-stage gear 20 may be kept a certain distance away from the third-stage gear 17.

After the electric drill of the invention is powered up, the gear shaft 1 of the rotor of the motor is rotated and drives the first-stage gear 7 and the first-stage shaft 6 to be reversely rotated. The first-stage gear shaft 6 drives the second-stage gear 20 for the second-stage gear shaft 23 and the transition gear 9 to be forwardly rotated. The transition gear 9 drives the third-stage gear 17 to be reversely rotated.

When the drill head drills or taps, it bears pressure force and pushing force. The output shaft 12 is axially moved and presses a spring 14. After a spring 14 overcomes its elastic force, it contracts. A clutch block 26 of an output shaft 12 and a clutch convex platform 25 of the third-stage gear 17 are separated with each other. After being separated, the third-stage gear 17 is idly rotated with respect to the output shaft 12. The clutch block 26 of the output shaft 12 immediately engages with the clutch platform 25 of the second-stage and realizes the rigid connection. The output shaft 12 is driven by the second-gear shaft 23 and forwardly rotated; the drill head is also forwardly rotated with the output shaft 12; and the drill head normally drills or taps.

After the drill head drills or taps, when it moves outwards, the drill head does not bear any pressure force and pushing force. Being applied by elastic force of the spring 14, the clutch block 26 of the output shaft 12 and the clutch convex platform of the second-stage gear 20 are separated with each other. The second-stage gear shaft 23 is idly rotated. The clutch block 26 of the output shaft 12 immediately engages with the clutch platform 25 of the third-stage gear 17 and realizes rigid connection. The output shaft 12 is driven by the third-gear shaft 17 and reversely rotated. The drill head is also reversely rotated with the output shaft 12 and quickly exits, so that the drilling or the tapping is completed. When this structure taps, it has remarkable effectiveness.

What is claimed is:

1. An electric drill forward and reverse rotation automatic switching apparatus, comprising:
   a gearbox;
   a first-stage gear;
   a first-stage gear shaft;
   a second-stage gear;
   a second-stage gear shaft;
   a transition gear;
   a transition shaft;
   a third-stage gear; and
   an output shaft,
   wherein:
   the first-stage gear is fixed on the first-stage gear shaft;
   the first-stage gear is rotatably disposed on the gear box;
   the second-stage gear is fixed on the second-stage gear shaft;
   the second-stage gear shaft is rotatably disposed on the gear box;
   the transition gear is rotatably disposed on the transition shaft;
   the transition shaft is fixed on the gearbox;
   the output shaft is disposed on the gearbox;
   the third-stage gear is sleeved on the output shaft and rotatably disposed on the gearbox;
   the first-stage gear is configured to engage with a gear shaft of a rotor of a motor;
   the first-stage gear shaft engages with the second-stage gear and the transition gear simultaneously;
   the transition gear engages with the third-stage gear;
   the second-stage gear shaft and the output shaft are on a same axis; and
   the electric drill forward and reverse rotation automatic switching apparatus further comprises an automatic clutch mechanism disposed between the second-stage gear and the third-stage gear, the automatic clutch mechanism comprising:
   a first clutch convex platform disposed on the second-stage gear;
   a second clutch convex platform disposed on the third-stage gear;
   a clutch block disposed on the output shaft;
   a spring; and
   a ball,
   wherein:
   an end part of the output shaft is provided with a center hole;

the spring and the ball are mounted in the center hole in turn:

a head part of the second-stage gear shaft contacts with the ball and extends into the center hole; and the output shaft is axially movable against the spring with respect to the third gear and the gearbox, and the automatic clutch mechanism is configured such that:

when a force pushes the output shaft to move axially, the spring is in a contracted state to result in the clutch block separated from the second clutch convex platform of the third-stage gear and engaged with the first clutch convex platform of the second-stage gear so that the output shaft rotates in a same direction as the second-stage gear; and when no force pushes the output shaft to move axially, the spring is in a free state to result in the clutch block separated from the first clutch convex platform of the second-stage gear and engaged with the second clutch convex platform of the third-stage gear so that the output shaft rotates in a same direction as the third-stage gear which is opposite to that of the second-stage gear.

2. The electric drill forward and reverse rotation automatic switching apparatus of claim 1, further comprising a back plate provided between the second-stage gear and the third-stage gear, and wherein the back plate is fixed on the gearbox.

\* \* \* \* \*

UNITED STATES PATENT AND TRADEMARK OFFICE
CERTIFICATE OF CORRECTION

PATENT NO. : 8,973,455 B2
APPLICATION NO. : 13/983057
DATED : March 10, 2015
INVENTOR(S) : Feihao Xu Page 1 of 1

It is certified that error appears in the above-identified patent and that said Letters Patent is hereby corrected as shown below:

Please correct the error in the Title Page/Item 73/Assignee.

The correct Assignee should read:

ZHENGYANG INDUSTRIAL & INVESTMENT CO., LTD.
YONGKANG, ZHEJIANG PROVINCE (CN)

Signed and Sealed this
Twenty-second Day of December, 2015

Michelle K. Lee
*Director of the United States Patent and Trademark Office*